United States Patent
Breja et al.

(10) Patent No.: US 12,239,996 B2
(45) Date of Patent: Mar. 4, 2025

(54) MATERIAL REDUCTION MACHINE WITH DYNAMIC STARTUP CONTROL

(71) Applicant: Vermeer Manufacturing Company, Pella, IA (US)

(72) Inventors: Joseph Edward Breja, Pella, IA (US); David Isaac Barker, Des Moines, IA (US)

(73) Assignee: Vermeer Manufacturing Company, Pella, IA (US)

( * ) Notice: Subject to any disclaimer, the term of this patent is extended or adjusted under 35 U.S.C. 154(b) by 217 days.

(21) Appl. No.: 18/053,972

(22) Filed: Nov. 9, 2022

(65) Prior Publication Data

US 2023/0149942 A1 May 18, 2023

Related U.S. Application Data (60) Provisional application No. 63/279,452, filed on Nov. 15, 2021.

(51) Int. Cl.
*A01G 23/06* (2006.01)
*B02C 13/30* (2006.01)
*B02C 25/00* (2006.01)

(52) U.S. Cl.
CPC ............ *B02C 25/00* (2013.01); *A01G 23/067* (2013.01); *B02C 13/30* (2013.01)

(58) Field of Classification Search
CPC ........ B27L 11/00; B27L 11/005; B27L 11/02; B27L 11/04; B27L 11/06; B27L 11/08; A01G 23/067
See application file for complete search history.

(56) References Cited

U.S. PATENT DOCUMENTS

| 4,442,877 A | 4/1984 | Uitermarkt |
| 4,567,975 A | 2/1986 | Roll |

(Continued)

FOREIGN PATENT DOCUMENTS

| EP | 2151156 A2 | 2/2010 |
| EP | 3854482 A1 | 7/2021 |

(Continued)

OTHER PUBLICATIONS

European Patent Office Action for Related Application No. 22207161.5 dated Apr. 24, 2023 (10 pages).

*Primary Examiner* — Matthew Katcoff
(74) *Attorney, Agent, or Firm* — Michael Best & Friedrich LLP (57) ABSTRACT

A material reduction machine includes a prime mover driving a cutting mechanism. A drive system receives a signal to initiate rotation of a cutting mechanism. A sensor senses a machine load parameter and reports a signal to a controller operatively coupled to the clutch to control sequential engagement cycles from the engine to the cutting mechanism. The controller utilizes a stored first disengagement threshold value for stopping a first engagement cycle and continues monitoring the signal as the machine load parameter increases momentarily after reaching the first disengagement threshold. The controller determines and adopts a second disengagement threshold value based on observation of the machine load parameter indicative of maximum load during the continued monitoring after the first disengagement threshold is realized, and further being based on a stored correction factor. The second disengagement threshold value is used for a second engagement cycle.

26 Claims, 8 Drawing Sheets

(56) References Cited

U.S. PATENT DOCUMENTS

| | | |
|---|---|---|
| 4,986,401 A | 1/1991 | Petzold et al. |
| 5,050,714 A | 9/1991 | Kurihara et al. |
| 5,088,532 A | 2/1992 | Eggers et al. |
| 5,094,332 A | 3/1992 | Wall |
| 5,692,548 A | 12/1997 | Bouwers et al. |
| 5,692,549 A | 12/1997 | Eggers |
| 5,845,689 A | 12/1998 | Egging et al. |
| 6,138,932 A | 10/2000 | Moore |
| 6,227,999 B1 | 5/2001 | Wheeler |
| 6,253,140 B1 | 6/2001 | Jain et al. |
| 6,557,687 B1 | 5/2003 | Herchick |
| 6,641,504 B2 | 11/2003 | Genise et al. |
| 6,840,471 B2 | 1/2005 | Roozeboom et al. |
| 6,943,676 B2 | 9/2005 | Mack |
| 7,011,258 B2 | 3/2006 | O'Halloran et al. |
| 7,048,106 B2 | 5/2006 | Hou |
| 7,077,345 B2 | 7/2006 | Byram et al. |
| 7,213,779 B2 | 5/2007 | Roozeboom et al. |
| 7,234,366 B2 | 6/2007 | Hou |
| 7,441,719 B2 | 10/2008 | Verhoef et al. |
| 7,546,964 B2 | 6/2009 | Bouwers |
| 7,637,444 B2 | 12/2009 | Stetter et al. |
| 7,746,619 B2 | 6/2010 | Harnett et al. |
| 8,056,695 B2 | 11/2011 | Silbernagel |
| 8,066,619 B2 | 11/2011 | Herchick et al. |
| 8,320,096 B2 | 11/2012 | Harnett |
| 8,684,291 B2 | 4/2014 | Galloway et al. |
| 10,039,239 B2 | 8/2018 | Brand et al. |
| 10,350,608 B2 | 7/2019 | Helland |
| 10,648,520 B2 | 5/2020 | Boland et al. |
| 11,730,085 B2 * | 8/2023 | Simon ..................... B02C 18/24 144/373 |
| 2009/0264253 A1 | 10/2009 | Herchick et al. |
| 2014/0031185 A1 | 1/2014 | Bradley et al. |
| 2020/0178482 A1 | 6/2020 | Breja et al. |
| 2020/0316611 A1 | 10/2020 | Lindner |
| 2021/0229108 A1 | 7/2021 | Soldan et al. |

FOREIGN PATENT DOCUMENTS

| | | |
|---|---|---|
| WO | 9846907 A2 | 10/1998 |
| WO | 2012072385 A1 | 6/2012 |
| WO | 2017188932 A1 | 11/2017 |

\* cited by examiner

MATERIAL REDUCTION MACHINE WITH DYNAMIC STARTUP CONTROL

CROSS-REFERENCE TO RELATED APPLICATIONS

This application claims the benefit of priority of U.S. Provisional Patent Application No. 63/279,452, filed Nov. 15, 2021, the entire contents of which are incorporated by reference herein.

BACKGROUND

The present invention relates to material reduction machines, for example, stump cutters, brush chippers, and grinders, and more particularly to startup control for rotating a material reduction device, such as a drum or wheel of such material reduction machines.

Material reduction machines such as brush chippers, grinders, and stump cutter machines are well known. These machines commonly include a rotating cutter wheel or drum driven by a prime mover (e.g., a gas or diesel engine). Stump cutters (also known as stump chippers or stump grinders) typically include a cutter wheel, which, while rotating, is advanced toward the stump and moved laterally across the face of the stump. Often, the cutter wheel is automatically advanced across the face of the stump in a sweeping motion. The cutter wheel is mounted to one end of a boom which is, in turn, pivotally mounted on a support frame. Hydraulic boom swing cylinders are used to pivot the boom about the pivot point to move the cutter wheel back and forth across the face of the stump to cut it away. Example prior art stump cutters are shown in U.S. Pat. Nos. 5,845,689 and 10,039,239; and U.S. Publication No. 2020/0178482 each owned by Vermeer Manufacturing Company; these documents are each incorporated herein by reference in their entirety and form part of the current disclosure.

Brush chippers typically contain sharp knives that cut material such as whole trees and branches into smaller woodchips. Grinders, on the other hand, typically contain hammers which crush aggregate material into smaller pieces through repeated blows. Example prior art brush chippers are shown in U.S. Pat. Nos. 10,350,608; 8,684,291; 7,637,444; 7,546,964; 7,011,258; 6,138,932; 5,692,549; 5,692,548; 5,088,532; and 4,442,877; and U.S. Publication Nos. 2014/0031185 and 2021/0229108 each owned by Vermeer Manufacturing Company; these documents are each incorporated herein by reference in their entirety and form part of the current disclosure. Example grinders are disclosed in U.S. Pat. Nos. 10,350,608; 7,441,719; 7,213,779; 7,077,345; and 6,840,471, each owned by Vermeer Manufacturing Company; these patents are each incorporated herein by reference in their entirety and form part of the current disclosure as well.

Material reduction machines may have additional features, for example, stump cutters may have handles. The handles may include features such as sensors configured for determining the presence of the operator. The operator station of a stump cutter machine often includes hydraulic control levers that are operated by the operator and other switches/controls, such as a control for starting and stopping the rotation of the material reduction device.

Material reduction machines often include a drive system. The drive system includes a coupling, also referred to as a clutch throughout this disclosure, and power transfer element(s) (such as gear boxes and drive shafts) which are coupled to and driven by the engine. When the coupling is in an engaged state, the drive system is configured to transfer power from the engine through the drive system elements for driving the material reduction device. The coupling also has a disengaged state configured to inhibit transfer of power from the engine to the material reduction device.

Many existing material reduction machines initiate clutch engagement when the prime mover is at a low idle speed, thus providing for smooth engagement and start-up of the material reduction device. The present disclosure relates to initiating clutch engagement when the prime mover is at a predetermined idle speed that is above the low idle speed. Engaging the clutch at a predetermined idle speed may be necessary for various reasons, such as avoidance of a critical drive system frequency defined by range of engine speed (a limited range between low and high idle speeds) that causes high vibration and rough engagement. A challenge associated with engaging a clutch at a predetermined prime mover speed, particularly if the speed is relatively high, is the amount of power required to overcome the stationary inertial load of the drive system and material reduction device. The high inertial load may cause the prime mover speed to drop significantly, or in the case of an internal combustion engine, kill the engine, if the clutch were to be continuously engaged as the engine attempts to increase the speed of the material reduction device from stationary to operating speed. Additionally, if the prime mover speed were to cause the drive system to drop below the critical drive system frequency due to a continuously engaged clutch, the drive system would pass through the critical drive system frequency as the prime mover increases speed, causing high vibration, possible machine damage, and poor perception of machine quality. Therefore, the material reduction machine of the present disclosure is configured to initiate start-up of the material reduction device at high prime mover speeds by cyclically engaging the clutch via a controller that is dynamic and automatic in responding and adapting to the load placed on the prime mover to provide a smooth start-up of the material reduction device.

SUMMARY

In one aspect, the invention provides a material reduction machine including a cutting mechanism and a prime mover coupled with the cutting mechanism by a drive system to drive the cutting mechanism. The drive system has a clutch with an engaged state to transfer power from the prime mover to the cutting mechanism and a disengaged state where power is not transferred from the prime mover to the cutting mechanism. A sensor is operable to sense a machine load parameter. A controller is coupled to the sensor and configured to receive a signal representing the sensed machine load parameter. The controller is operatively coupled to the clutch to control engagement and disengagement of each of a plurality of sequential engagement cycles of the clutch. The controller is configured to utilize a stored first disengagement threshold value of the machine load parameter for stopping a first disengagement cycle of the plurality of sequential disengagement cycles when the sensor signals to the controller that the first disengagement threshold value is realized, and the controller is configured to continue monitoring the sensor signal as machine load increases momentarily after reaching the first disengagement threshold. The controller is configured to determine and adopt a second disengagement threshold value, the second disengagement threshold value being based on an observation of the machine load parameter indicative of maximum load during the continued monitoring after the first disengagement threshold is realized, and further being based on a stored correction factor. The controller is configured to utilize the second disengagement threshold value for disengaging the clutch during a second engagement cycle of the plurality of sequential engagement cycles following the first engagement cycle when the sensor signals to the control that the second disengagement threshold value is realized.

In another aspect, the invention provides a material reduction machine including a cutting mechanism, an internal combustion engine, and a drive system to selectively transfer power from the internal combustion engine to the cutting mechanism. The drive system has a clutch. The clutch has an engaged state wherein the clutch transfers power from the prime mover to the cutting mechanism, and a disengaged state where power is not transferred from the prime mover to the cutting mechanism. A sensor is operable to sense a load on the material reduction machine via detection of droop in the operation speed of the internal combustion engine. A controller is coupled to the sensor and configured to receive a signal indicative of the sensed droop in the operation speed of the internal combustion engine, the controller being operatively coupled to the clutch to control power transfer during of each of a plurality of sequential power transfer cycles. The controller is configured to utilize a stored first operation speed trip point for stopping a power transfer cycle of the plurality of sequential power transfer cycles when the sensor signals to the controller that the first operation speed trip point is realized, and the controller is configured to continue monitoring further droop in the operation speed via the sensor signal as machine load increases momentarily after reaching the first operation speed trip point. The controller is configured to determine and adopt a second operation speed trip point, the second operation speed trip point being based on an observation of a minimum operation speed during the continued monitoring after the first operation speed trip point is realized, and further being based on a stored correction factor. The controller is configured to utilize the second operation speed trip point for stopping a second power transfer cycle of the plurality of sequential power transfer cycles following the first power transfer cycle when the sensor signals to the control that the second operation speed trip point is realized.

In yet another aspect, the invention provides a method of controlling a material reduction machine including a cutting mechanism and a prime mover coupled with the cutting mechanism to drive the cutting mechanism. The prime mover is operated to drive the cutting mechanism at a no load operation speed. A clutch is engaged to transfer power from the prime mover to the cutting mechanism to start a first engagement cycle. A machine load parameter is sensed with a sensor that reports signals to a controller in control of the engagement and disengagement of the clutch to control stopping and starting of each of a plurality of sequential engagement cycles the prime mover. Disengagement of a first engagement cycle of the plurality of sequential engagement cycles is triggered via the controller in response to the sensor signaling to the controller that a stored first disengagement threshold value is realized. With the controller, monitoring of the machine load parameter sensor signal is continued as machine load increases to a maximum load momentarily after reaching the first disengagement threshold. The controller determines and adopts a second disengagement threshold value based on the value of the machine load parameter at the time of maximum load after the first disengagement threshold is realized, and further based on a stored correction factor. Via the controller, disengagement of a second engagement cycle of the plurality of sequential engagement cycles is triggered following the first engagement cycle in response to the sensor signaling to the controller that the second disengagement threshold value is realized.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
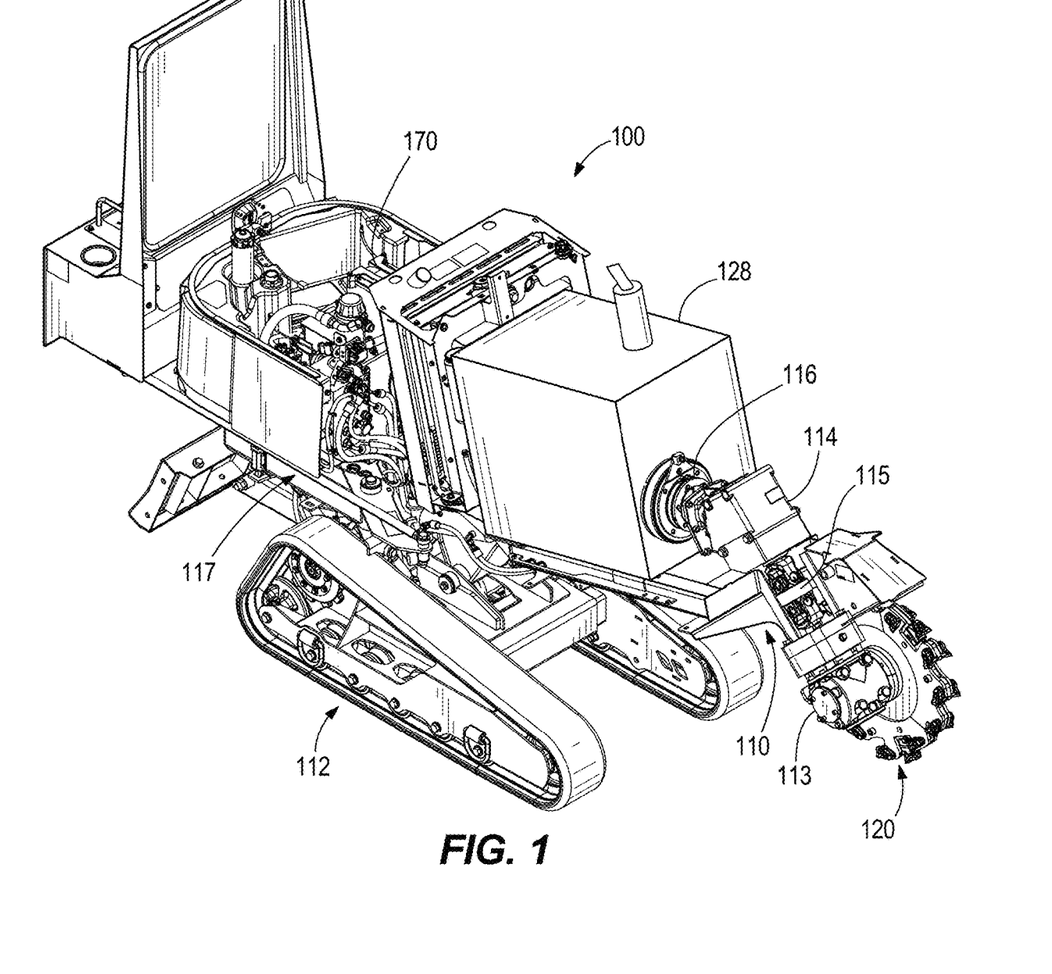
FIG. 1 is a perspective view of a stump cutter according to one embodiment of the present disclosure, with components hidden for illustration.
Figure 2:
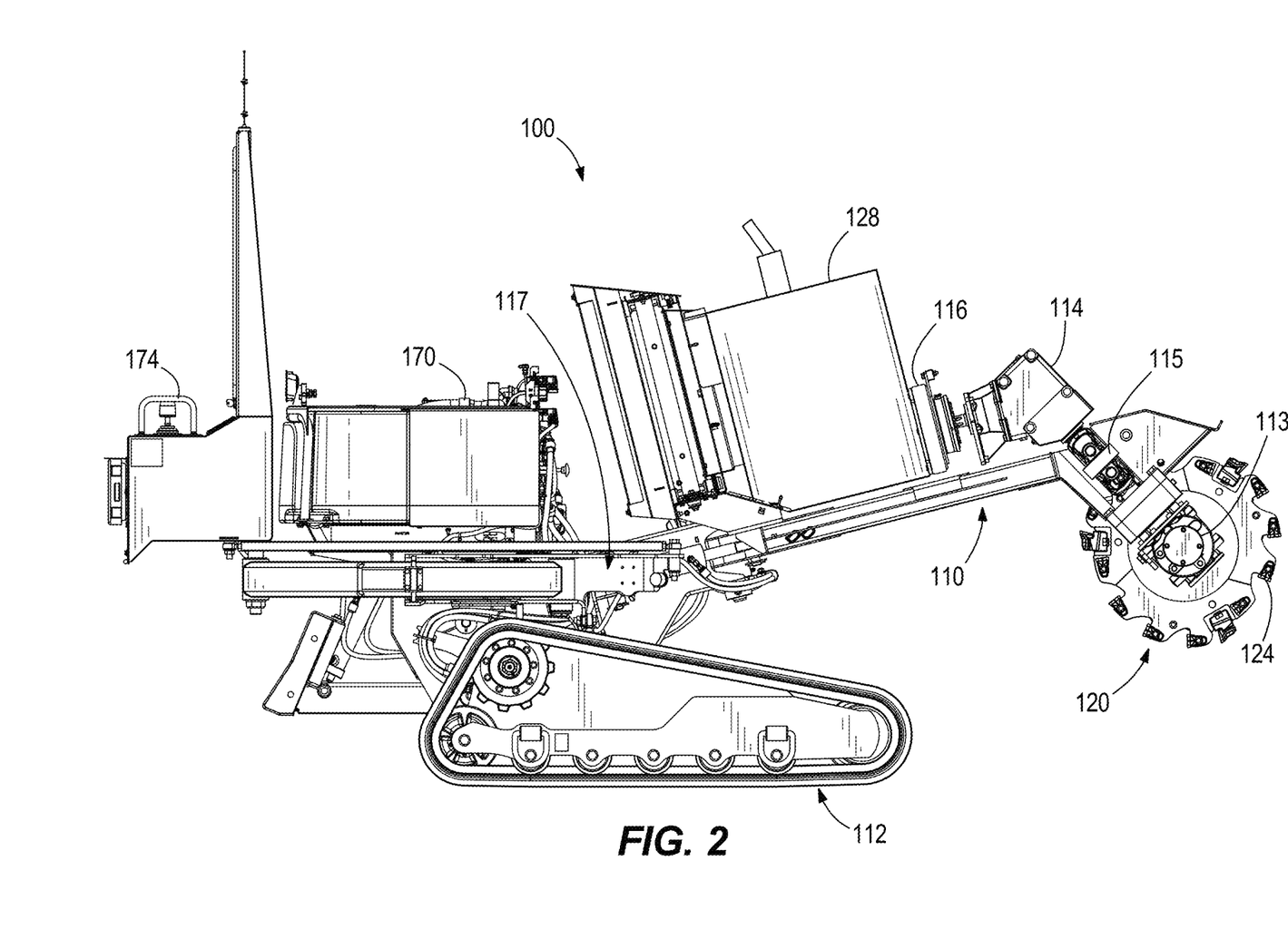
FIG. 2 is a side view of the stump cutter of FIG. 1, with components hidden for illustration.

FIGS. 1 and 2 illustrate a stump cutter 100, according to one embodiment. The stump cutter 100 includes a cutting mechanism in the form of a cutter wheel 120 for reducing stumps into smaller pieces. A boom frame 110 supports the cutter wheel 120. The boom frame 110 may further be supported by a main frame 117 which include tracks or wheels 112 for ground movement of the stump cutter 100. Mobility may not be desirable in all cases, such as grinder embodiments, and stationary embodiments are also contemplated. The cutter wheel 120 (FIG. 2) includes cutting teeth 124. Cutting teeth are well known, and any appropriate cutting tooth (whether now known or later developed) may be used to process material into smaller pieces. The cutter wheel 120 is driven by a prime mover 128, such as an internal combustion engine (e.g., gasoline or diesel) or an alternative power source(s), such as one or more electric motors. Portions of this disclosure refer to the prime mover 128 directly as the engine 128 with the understanding that specific references to the engine are not limiting to the overall scope of the disclosure, which has aspects extending to prime movers other than internal combustion engines. The cutter wheel 120 can be engaged or disengaged with the prime mover 128 by a clutch 116.

The cutter wheel 120 is selectively powered by the engine 128. A drive system can transfer power from the prime mover 128 to the cutter wheel 120. The drive system may include the clutch 116, a first or proximal gearbox 114, a driveline 115 (driveline 115 may have couplers and joints, such as universal joints), and a second or distal gearbox 113. Alternative drive components, such as belts, are considered within the scope of the present disclosure. The drive system may include a brake for slowing and stopping rotation of the cutter wheel 120 in certain situations. The clutch 116 includes engaged and disengaged states. When the clutch is in an engaged state, the drive system is configured to transfer power from the engine 128 through the drive system to rotate the cutter wheel 120. When the clutch 116 is in a disengaged state, the drive system is configured to inhibit transfer of power from the engine 128 to the cutter wheel 120.

Although other types of clutches are also contemplated, the clutch 116 can be an electromagnetic clutch in some constructions. The engaged and disengaged states of the clutch 116 is at least partially controlled by a control system. A controller 170 of the control system may be in direct or indirect control of the clutch 116, among other components of the stump cutter 100. The clutch 116 is engaged when an electrical signal is sent to the clutch 116 by the controller 170. The clutch 116 is disengaged when no electrical signal is sent to the clutch 116 by the controller 170. Although the clutch 116 may be capable of operating with various amounts of current or at various voltages, this is not the subject of the present disclosure, so it may be assumed that supplied voltage is "on" during clutch engagement and the supplied voltage is "off" during clutch disengagement, and the supplied voltage is not varied. In the case of using pulse width modulation (PMW), the voltage is rapidly turned on and off (example: 200 Hz), therefore the average voltage over time is considered the constant supply voltage. Additionally, the terms "engaged" and "disengaged" as used in connection with a clutch refer to the capacity, or lack of capacity, respectively, of the clutch to transfer a significant amount of torque. Mere random contact of the friction surfaces, in the absence of an engagement signal, is not considered engagement.

One of ordinary skill in the art will appreciate that many of the various electrical and mechanical parts discussed herein can be combined together or further separated apart. The controller 170 may include one or more electronic processors and one or more memory devices. The controller 170 may be communicably connected to one or more sensors or other inputs, such as described herein. The electronic processor may be implemented as a programmable microprocessor, an application specific integrated circuit (ASIC), one or more field programmable gate arrays (FPGA), a group of processing components, or with other suitable electronic processing components. The memory device (for example, a non-transitory, computer-readable medium) includes one or more devices (for example, RAM, ROM, flash memory, hard disk storage, etc.) for storing data and/or computer code for completing the or facilitating the various processes, methods, layers, and/or modules described herein. The memory device may include database components, object code components, script components, or other types of code and information for supporting the various activities and information structure described in the present application. According to one example, the memory device is communicably connected to the electronic processor and may include computer code for executing one or more processes described herein. The controller 170 may further include an input-output ("I/O") module. The I/O module may be configured to interface directly interface with one or more devices, such as a power supply, sensors, displays, etc. In one embodiment, the I/O module may utilize general purpose I/O (GPIO) ports, analog inputs/outputs, digital inputs/outputs, and the like.

Referring primarily to FIG. 2, one or more operator controls 174 may additionally be in data communication with the controller 170. The operator controls 174 can include, for example, levers, switches, dials, buttons, or any other appropriate controls, whether now existing or later developed. In some embodiments, at least one of the operator controls 174 is not in direct physical communication with the controller 170, and instead communicates with the controller 170 wirelessly, such as through one or more of near-field (e.g. Bluetooth, Bluetooth Low Energy, LoRA, Near Field Communication ("NFC"), Wi-Fi, Wi-Max, etc.), radio (e.g. RF), or cellular communication technology (e.g. 3G, 4G, 5G, LTE, etc.). In some constructions, the operator control(s) 174 and the controller 170 may be part of a controller area network (CAN) of the stump cutter 100 (e.g., SAE J1939 for heavy duty vehicles).

The stump cutter 100 can be set to a variety of idle engine speeds between and including a low idle speed and a high idle speed. The low and high idle speeds can correspond, respectively, to the minimum and maximum throttle settings of the engine 128. Although the engine speed can be maintained at the desired idle speed when unloaded, engine speed will droop according to the load applied. Many prior stump cutters have initiated clutch engagement when the engine 128 is at or near low idle speed, thus providing for smoother engagement and start-up of the cutter wheel 120 due to a small speed differential. However, stump cutter 100 of the present disclosure initiates clutch engagement at a predetermined idle engine speed, the "engagement idle," which may be a relatively high engine speed (e.g., above the low idle speed, and in some constructions, nearer the high idle speed than the low idle speed). The clutch 116 is engaged at engine speeds sufficiently high to avoid the engine speed drooping into a mid-range engine speed (an engine speed or speed range between low and high idle speeds, referred to below as the "critical" speed) that may cause high vibration and rough engagement due to a critical drive system frequency. As described below, the controller 170 of the present disclosure can be programmed in relation to a predetermined minimum allowable engine speed during clutch engagement, the minimum allowable engine speed being set at or above the critical speed. A challenge associated with engaging the clutch 116 at high engine speeds is the amount of power required to overcome the stationary inertial load of the drive system and the cutter wheel 120 since the speed differential is high between the cutter wheel 120 and the engine 128. The high inertial load may cause the engine speed to drop significantly, or even kill the engine 128, if the clutch 116 were to be continuously engaged as cutter wheel speed increases from stationary to operating speed. If the engine 128 were to drop below the critical speed due to continuous engagement of the clutch 116, the drive system will then be forced to pass through the critical drive system frequency as the engine speed and cutter wheel speed increase together—similar to an engagement that starts from a low engine speed below the critical speed. When the drive system is connected such that the cutter wheel 120 imposes a load on the engine 128, engine operation passing through the critical speed will cause brief but undesirable high vibration, which can lead to possible machine damage, and poor perception of machine quality. As mentioned, the stump cutter 100 of the present disclosure is configured to initiate start-up of the cutter wheel 120 at a predetermined higher engine speed, above and offset from the critical engine speed, by cyclically engaging the clutch 116 via the controller 170 that is dynamic and automatic in responding and adapting to the load placed on the engine 128 to provide a smooth start-up of the cutter wheel 120. As such, this start-up process avoids driving the cutter wheel 120 with the engine 128 at the critical speed.

Although it is possible to size the engine 128 so as to enable start-up of the cutter wheel 120 without a significant amount of droop (i.e., load-induced drop in operating speed), this is generally impractical and/or unreasonable due to the cost and size of such an engine. Additionally, this would lead to a gross oversizing of the engine for most work operations. Thus, while other control operations may be carried out after the cutter wheel 120 has reached operating speed, such as those disclosed in U.S. Pat. No. 5,845,689 and U.S. Publication No. 2020/0178482 related to control of a cutting wheel and boom during cutting, the subject of this disclosure is the start-up control system of the cutter wheel 120 which is configured to perform cyclic engagement and disengagement of the clutch 116. That is, the clutch 116 engages to transfer power from engine 128 to cutter wheel 120, followed by the clutch 116 disengaging (no transfer power from engine 128 to cutter wheel 120), followed by the clutch 116 engaging again, and so on until the cutter wheel 120 reaches operating speed and is ready to begin a cutting operation. The length of each engagement cycle in the series of engagement cycles may vary as engagement of the clutch 116 is in accordance with a disengagement threshold, or "trigger," or "trip-point" of a monitored parameter. In some examples, the length of an individual engagement cycle is a fraction of a second, and the complete cutter wheel start-up process (having multiple engagement cycles) may average approximately 2-3 seconds in some constructions. This type of cyclic clutch control allows a smaller-sized engine 128 to be used to initiate rotation of the cutter wheel 120 by powering cutter wheel start-up in bursts so as to keep the engine speed within a predetermined acceptable speed range. Satisfactory start-up of the cutter wheel 120 may otherwise be impossible due to overloading the engine 128, which would lead to stalling, or a dragging down of the engine 128 out of the acceptable speed range, for example, along with other possible consequences such as inefficient operation and even component damage under certain circumstances.

The monitored parameter related to the disengagement threshold can correlate to a load exerted on the engine 128. In other words, the disengagement threshold controls how much load is allowed on the prime mover 128 due to engagement of clutch 116. As discussed in further detail below, the disengagement threshold is variable in accordance with certain aspects of the invention to provide a dynamic start-up control that learns according to an iterative learning program executed by the controller 170 of the stump cutter 100, providing cycle-to-cycle adjustment during the start-up of cutter wheel 120. The start-up control system operates to meet the objective of maintaining the prime mover 128 within a predetermined range of operation. An internal combustion engine responds naturally to increased load with a reduction, or droop, in operating speed of the engine, given in crankshaft revolutions per minute (RPM) for example, from a predefined (high idle) engine speed setting at which the engine is set to run with no applied cutting load. As described in at least one specific example below, the predetermined range of operation may be defined by a minimum acceptable engine operating speed. The minimum acceptable engine operating speed can be preset and stored within a memory of the controller 170. The minimum acceptable engine operating speed can be set to maintain operation (avoid stalling) and more particularly to maintain operation within a desired power band of the engine 128.

Aspects of the present disclosure include at least one load sensor for directly or indirectly monitoring the load applied to the prime mover 128. In the case of the prime mover 128 of the stump cutter 100 being an internal combustion engine, the load sensor can be configured to measure operating speed of the engine 128 rather than directly measuring load in the form of a force or torque. As mentioned above, engine operating speed acts as a surrogate engine load parameter since the operating speed changes in response to load in a predictable manner correlated to and/or indicative of the load as the engine throttle setting remains fixed. Alternatively, or additionally, one or more load sensors can measure operating speed downstream of the prime mover 128 as described further below.

In some constructions, the machine load parameter monitored during the start-up control is not a parameter of the prime mover 128 at all, but rather, a parameter of a component connected to, for example driven from, the prime mover 128. For example, the load sensor can be configured to measure a speed of on one or both of the cutter wheel 120 and the driveline 115 between the prime mover 128 and the cutter wheel 120. In some constructions, the load sensor is configured to measure load on the driveline 115. Such a driveline load sensor can be provided as a torque or slip sensor on the clutch 116. Such a driveline load sensor can alternately be provided as a load sensing (e.g., strain) gauge on a drive shaft, gearbox, or crankshaft. It should be appreciated that various disclosed implementations can be used individually or combined together in various combinations to achieve the objectives of the present disclosure.

In the case of an electric motor as the prime mover 128, the predetermined range of operation for the prime mover may be defined by an acceptable amount of electrical current draw. Thus, the load sensor can take the form of a current sensing circuit or "current sensor." The dynamic start-up control, as described in further detail below, allows the stump cutter 100 to optimize the clutch engagement cycles to bring cutter wheel 120 up to operating speed, even without any initial input information to the controller 170 regarding the characteristics of the drive system, such as variations or changes to the cutter wheel, cutters, gearbox, driveline, etc.

Figure 3:
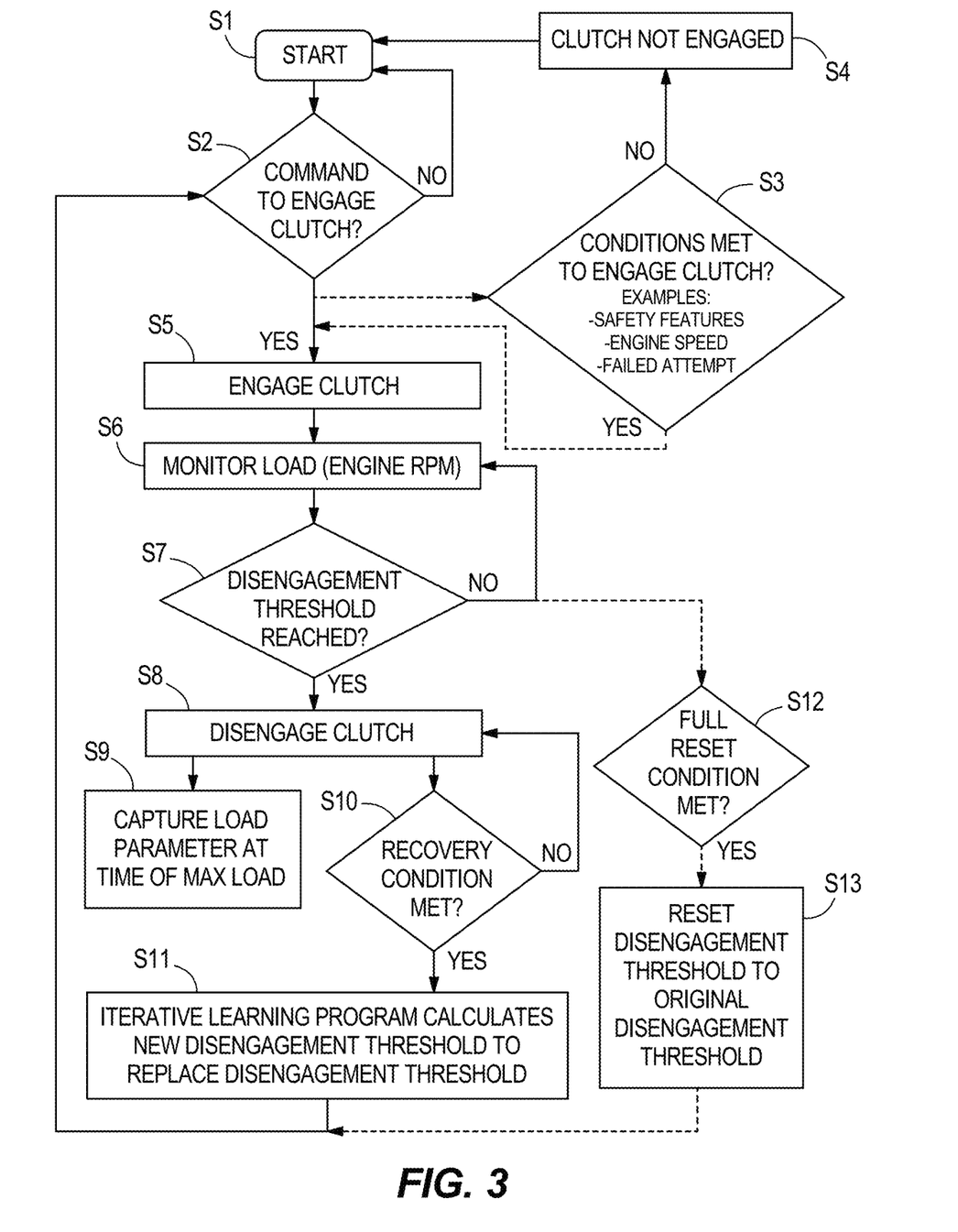
FIG. 3 illustrates a flowchart for an exemplary process carried out by the stump cutter of FIG. 1.

An exemplary sequence for the dynamic start-up control is schematically illustrated in FIG. 3, with the understanding that variations thereof are also within the scope of the present disclosure. The steps of the sequence shown in FIG. 3 are carried out within and by the controller 170 to accomplish the dynamic start-up control. The sequence starts at step S1, which may occur upon startup of the stump cutter 100 or may be triggered by a particular initialization, e.g., from the operator. At step S2, the controller 170 waits for a command to engage the clutch 116. At step S3 the controller 170 determines whether or not the clutch 116 can be engaged (e.g., checks safety features such as operator presence, and/or ensures engine speed has reached engagement threshold, etc.). In some constructions, step S3 is eliminated, or occurs prior to the steps outline in the start-up schematic of FIG. 3, and the process flows directly from step S2 to step S5. If incorporated, the determination of step S3 can be made on the basis of information from the prime mover sensors and operator presence sensors. When conditions to engage the clutch 116 are not met at step S3, the clutch 116 will not be engaged, the process may revert to step S1. Optionally, at step S4 an alert may be sent to the operator related to the reason for not engaging the clutch 116. As described in further detail following the description of the dynamic start-up control, the controller 170 can also detect and keep track of a recent unsuccessful cutter wheel start-up such that step S3 prevents repeated start-up attempts under conditions where the cutter wheel 120 is prevented from achieving a successful start-up.

Engagement of the clutch 116 at step S5 begins the initial engagement cycle of the cutting mechanism. As mentioned above, some amount of load is inherent during the initial engagement cycle, but it is desirable to keep load on the prime mover 128 within prescribed boundaries. As such, the controller 170 monitors load via a load parameter (e.g., engine speed sensor) at step S6. At step S7, values of the load parameter are monitored by the controller 170, periodically or continuously, to determine whether a disengagement threshold value for the load parameter has been reached. In response to the disengagement threshold value being reached, the clutch 116 is disengaged by the controller 170 at step S8. The disengagement threshold value for the first engagement cycle can be a stored value accessed by the controller 170. For example, the disengagement threshold value may be stored in a memory (not shown) of the controller 170. The initial disengagement threshold value is not representative of the actual minimum engine speed (droop). It is expected that the actual minimum speed of prime mover 128 will continue to drop briefly. This continued speed drop may be due to the lag in response of components after recognition of the initial disengagement threshold, for example, the time it takes for the clutch 116 to disengage. There may also be contributing lag in the reporting from the engine speed sensor and/or within the controller 170. In any case, the construction of the stump cutter 100 makes it impractical to control the minimum allowable engine speed by using the minimum allowable engine speed as the disengagement point. In practice, step S7 may be a timed step where the controller 170 is programmed to only monitor for the disengagement threshold for a predefined amount of time (e.g., not more than 3 seconds, not more than 2 seconds, or not more than 1.5 seconds). If the disengagement threshold is not reached within this amount of time, the cutter wheel 120 is deemed to be successfully engaged, and the dynamic start-up control routine of FIG. 3 is terminated. This also corresponds to the monitoring for full reset condition at step S12 described further below.

After the clutch 116 is disengaged at step S8, two subsequent actions take place. First, the controller 170 detects and stores the engine speed as the load parameter value at the time of minimum engine speed at step S9. Second, the controller 170 monitors the engine speed to determine whether a recovery condition indicative of reduced load is achieved at step S10 (e.g., an increase in engine speed). The minimum engine speed occurs after the disengagement threshold is reached (S8) and prior to the recovery. In response to determining that the recovery condition is met, the stump cutter 100 is ready to begin the next engagement cycle on the cutter wheel 120, however, before beginning the next engagement cycle, the controller 170 is configured to first determine, based on the preceding engagement cycle, how to run a modified next engagement cycle. In particular, the controller 170 calculates a second disengagement threshold (e.g., new disengagement threshold) value at step S11. In one embodiment, the minimum engine speed following clutch disengagement at step S8 is the controlling parameter used in step S11 to calculate the second disengagement threshold. The second disengagement threshold replaces the initial disengagement threshold. The controller 170, in carrying out step S11, may compare and ascertain a difference between the load parameter value from step S9 and a stored target value for the load parameter that corresponds to the minimum allowable load parameter value (e.g., according to a manufacturer's recommendation based on empirical data). In the example of engine speed as the load parameter, this equates to a comparison between a lowest recorded engine speed below the disengagement threshold engine speed and a target value for lowest allowable engine speed. A correction factor can be applied to the calculated difference by the controller 170 in order to determine the second disengagement threshold to be used for the next engagement cycle. The equation may be expressed as $n_{i+1}=n_i+k*(nX-nY)$ where $n_i$ is the current, or in the case of the completion of the first engagement cycle, the original disengagement threshold operating speed, nX is the target value or lowest allowable operating speed, nY is the lowest recorded engine speed during an engagement cycle, k is the correction factor, and $n_{i+1}$ is the calculated subsequent disengagement threshold operating speed.

The correction factor, which may be pre-programmed to the controller 170, may be 1 or less, for example 0.25 or 0.3 or 0.5. The sign of the difference (of nX−nY) may be carried through the calculation so that, if resulting in a negative result, the subsequent disengagement threshold $n_{i+1}$ will be lower than the current or initial disengagement threshold $n_i$, although the initial disengagement threshold may be set as a value highly likely to prevent the actual minimum engine speed from exceeding the minimum allowable engine speed. Thus, the first engagement cycle may utilize a disengagement threshold that leaves a positive safety margin with respect to the actual minimum allowable engine speed. The purpose of successive engagement cycles is to gradually bring the cutter wheel 120 up to operating speed. The newly calculated disengagement threshold for the second engagement cycle then brings the actual minimum engine speed during the second engagement cycle closer to the minimum allowable engine speed. As shown in FIG. 3, the controller 170 returns to step S2 in response to calculating the new disengagement threshold so that the stump cutter 100 performs sequential engagement cycles on the cutter wheel 120 as long as the S10 recovery condition is met. Thus, the engine speed data gathered at the end of the second engagement cycle is used by the controller 170 to calculate a third disengagement threshold in a manner similar to how the second disengagement threshold was calculated on the data from the first engagement cycle, and so on and so forth for as many engagement cycles as are required to get the cutter wheel 120 to an operating speed (the speed required to begin a chipping/cutting operation). As such, the actual minimum engine speed determined will, on a cycle-by-cycle basis, gradually home in on or creep toward the minimum allowable engine speed prescribed for the stump cutter 100 as the controller 170 learns how the stump cutter 100 responds to start-up of cutter wheel 120. In other words, the safety margin is dynamically reduced by the controller 170 so that the stump cutter 100 increases the speed of cutter wheel 120 up to an operating speed at or near its full capability despite not having manual or operator-controlled variable settings.

After a number of engagement cycles, the cutter wheel 120 is operating above the disengagement threshold and nearing or at an operating speed. When this occurs, the controller 170 may end the start-up process of FIG. 3 and move to a stump cutting process such as those described in U.S. Pat. No. 5,845,689 and/or U.S. Publication No. 2020/0178482, optionally, the controller may return to step S2, awaiting a command to begin the start-up process again.

When the next start-up process begins, it is preferable to reset the disengagement threshold to the default stored value. Reset of the disengagement threshold is illustrated in step S12 of FIG. 3. The circumstances for the disengagement threshold to be reset to the initial stored disengagement threshold (the disengagement threshold prior to any iterative learning), is illustrated schematically by steps S12 and S13, which if included in the controller program, may obstruct the controller 170 from carrying out step S11 in the case of a YES response to step S12. The full reset condition of step S12 can be one or any combination of the following non-limiting examples: (1) detection of the clutch 116 engaged for a prescribed length of time as described above (i.e. the disengagement threshold is not reached), or (2) if there is no command to engage the clutch 116 (i.e. step S2 is NO, the operator has not given a command or has turned off a command to engage the clutch), or (3) if any of the conditions mentioned related to step S3 cause the clutch 116 to not engage or disengage, or (4) detection of the prime mover 128 being at a no load state for a prescribed time.

Figure 4:
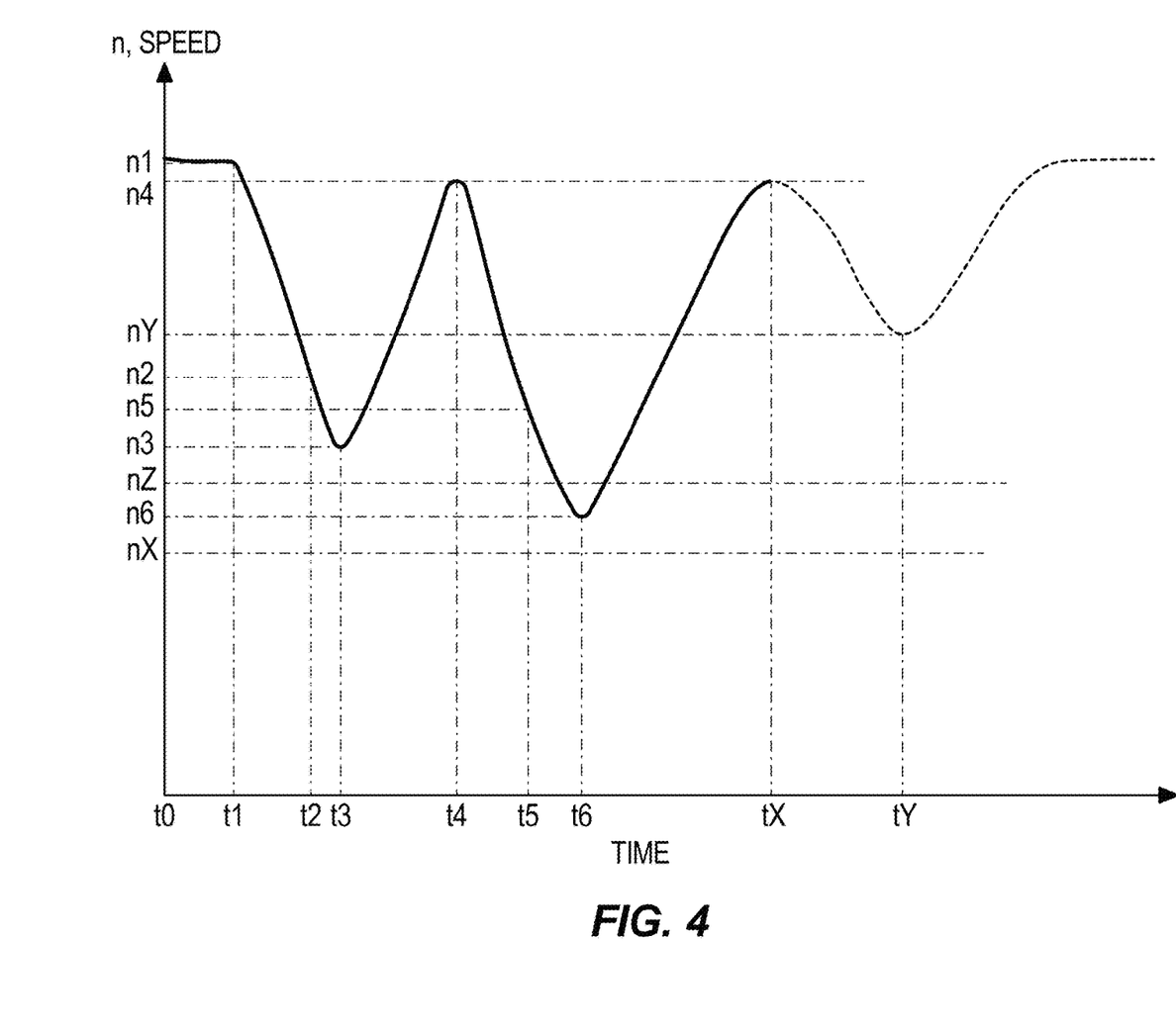
FIG. 4 is a graph of operating speed vs. time, illustrating sequential clutch engagement cycles carried out by the stump cutter.

FIG. 4 illustrates an exemplary plot of operating speed (n) of an internal combustion engine as the prime mover 128 versus time (t). Beginning at time t0, the engine 128 operates at a steady predetermined idle speed n1. In the context of FIG. 4 and its description, times of interest are labeled sequentially as t1, t2, etc. The operating speed n1 is the operating speed at time t1, the operating speed n2 is the operating speed at time t2, and so forth. This is done for simplicity in the description and comprehension of FIG. 4, and it bears noting that this convention results in the first disengagement threshold identified as n2 and the second disengagement threshold identified as n5, although they are sequential disengagement thresholds as per the $n_i$ and $n_{i+1}$ notation from above. Prior to t1, the engine 128 is not yet loaded by cutter wheel 120. Once the clutch 116 is engaged at time t1 (e.g., step S5 above), the drive system and the cutter wheel 120 begin to load the engine 128. Thus, the first engagement cycle begins at time t1. The load exhibits as a reduction in engine speed, which can be seen between times t1 and t3. Although shown as linear for simplicity, the engine speed may slow down nonlinearly in other constructions, and the shape of the curve may depend at least in part on the characteristics of the drive system and the rate at which the clutch 116 engages. At time t2, the initial disengagement threshold n2 is reached (step S7) and the clutch 116 is disengaged (step S8). However, due to the mechanics of the stump cutter 100, the engine speed continues to decrease somewhat up until time t3. At time t3 the minimum engine speed is recorded and saved for the subsequent engagement cycle. The engine speed begins to increase during "recovery" of the engine 128. The recovery threshold may be represented by n4 in FIG. 4. The first engagement cycle completes at time t4. The recovery threshold may be above or below the disengagement threshold. Also, it should be noted that while the chart depicts the engine speed peaking at t4, n4, the recovery threshold used for initiating the next engagement cycle may be lower than the peak engine recovery speed, i.e., the engine speed may actually continue to go up due to delays in the system before the engine speed actually peaks. Initiation of the next engagement cycle may rely on the recovery threshold "leading" the curve slightly in order to minimize the time the engine speed is fully recovered or at high idle and more importantly, minimize the amount of time the clutch 116 is disengaged. It is important to minimize the amount of time the clutch 116 is disengaged to prevent the cutter wheel 120 from slowing too much while the engine 128 is recovering. As will be appreciated, the event (clutch disengagement) at time t2 is directly controlled by the controller 170. On the other hand, the minimum engine speed at time t3 is not directly controlled by the controller 170, although it is resultant from the performance of the stump cutter 100 directly following the event at time t2. From time t3 to time t4, the engine speed naturally recovers and increases to a reset speed n4 at or near idle speed n1.

Also, after capturing the minimum engine speed n3, the controller 170 determines the difference between the minimum engine speed n3 and the minimum allowable engine speed nX. The correction factor is then applied to the difference to determine the disengagement threshold n5 for the second engagement cycle. The second engagement cycle commences at time t4, and the load again causes droop in engine speed until the second disengagement threshold n5 is reached at time t5. As with the first engagement cycle the engine speed continues to decrease from time t5 to time t6 where the minimum operating speed n6 is observed, similar to that experienced from time t2 to time t3 at the end of the first engagement cycle. Thus, the iterative learning program allows the minimum engine speed n6 following the second disengagement threshold to encroach upon the minimum allowable engine speed nX. From time t6, the engine 128 again recovers, and the controller 170 determines a new disengagement threshold for the next (third) engagement cycle (along the dotted line) based on the difference between nX and n6, and based on the correction factor. These steps repeat continuously, as the controller 170 learns how to set the disengagement threshold to come as close as possible to the predetermined minimum allowable engine speed nX, which is the speed preset to maintain operation within the desired performance range. Eventually, as represented by the dashed line and tX, which may occur several engagement cycles later, the clutch 116 engages, and since the cutter wheel 120 increases speed with each engagement cycle, the engine speed (represented by tY and nY) will not drop to the disengagement threshold nZ and the clutch 116 will be continuously engaged. At this point the stump cutter controller 170 may end the start-up logic (upon sensing parameters mentioned above) and begin the cutting/chipping control logic in preparation for a cutting operation.

As one non-limiting example, the following are an exemplary set of numerical parameters for the stump cutter 100 and the operating method thereof in accordance with the above description. In this example, the low and high idle speeds of the engine 128 can be 1200 RPM and 2900 RPM, respectively. The engagement idle speed n1 for the initial clutch engagement can be set as 2900 RPM, in other words equal to the high idle speed. The engagement idle speed n1 for the initial clutch engagement can be more broadly expressed as at least 70 percent, at least 80 percent, or at least 90 percent of the high idle speed. The critical engine speed can be approximately 2100 RPM, and the minimum allowable engine speed nX can be set higher, for example 2550 RPM to give a suitable margin. In order for the controller 170 to keep the engine speed at or above the minimum allowable engine speed nX, the initial disengagement threshold n2 can be 2815 RPM. The initial disengagement threshold n2, which may also be referred to as the initial droop setpoint, can be experimentally determined as the lowest possible value that does not allow the engine 128 to subsequently droop below the minimum allowable engine speed nX. As described above, the controller 170 determines each subsequent disengagement threshold based on the minimum recorded engine speed of the preceding engagement cycle. As the engine speed recovers following disengagement of the clutch 116 (e.g., from time t3 toward time t4), the controller 170 may be programmed with a reset speed or recovery threshold slightly lower than the engagement idle speed n1 as described above to lead the curve and have the subsequent clutch engagements occur at about the time that the engine speed recovers back to the engagement idle speed n1. For an engagement idle speed of 2900 RPM, the recovery threshold to start the next engagement cycle may be set to about 2725 RPM.

As mentioned above, step S3 may include logic in the controller 170 to prevent clutch engagement when the controller 170 determines that an unsuccessful cutter wheel engagement or start-up process has recently occurred (e.g., within a predetermined timeframe prior to the clutch engagement command S2). Unsuccessful cutter wheel engagement refers to a failure to put the cutting mechanism into a predefined running state that provides cutting, for example operating the cutter wheel 120 at a predefined speed and/or operating the cutter wheel 120 in direct relation to the prime mover 128. Among other reasons, an unsuccessful cutter wheel engagement may be the result of the cutter wheel 120 being lodged in a stump, or a broken driveline, for example. As such, engagement of the clutch 116 to apply torque from the prime mover 128 does not result in a normal increase in rotational speed of the cutter wheel 120. In order to make the determination that an unsuccessful cutter wheel engagement has recently occurred, the controller 170 may count the number of clutch engagements (e.g., the counter may cycle for each clutch engagement (S5) and/or each clutch disengagement (S8)). The controller 170 can be programmed to compare the number of consecutive clutch engagements without a successful start-up (e.g., without reaching step S12) to a stored limit value such that the consecutive clutch engagements are limited to the stored limit value as the maximum. Also, or alternatively, the controller 170 can monitor the speed of the driveline 115 and/or the cutter wheel 120 to determine unsuccessful cutter wheel engagement by speed failing to increase (remaining at zero) or by speed increasing less than a limit value over the course of one or a plurality of clutch engagement cycles. In practice, detecting unsuccessful cutter wheel start-up by speed monitoring may require two or more clutch engagement cycles. Thus, there may be an allowable threshold of time or number of clutch engagement cycles when detecting unsuccessful cutter wheel start-up via speed monitoring. When the controller 170 determines the cutter wheel start-up to be unsuccessful, the rest of the start-up process can be aborted and/or an alert can be triggered by the controller 170 and provided to the operator, for example via an alarm and/or a display notification.

Figure 5:
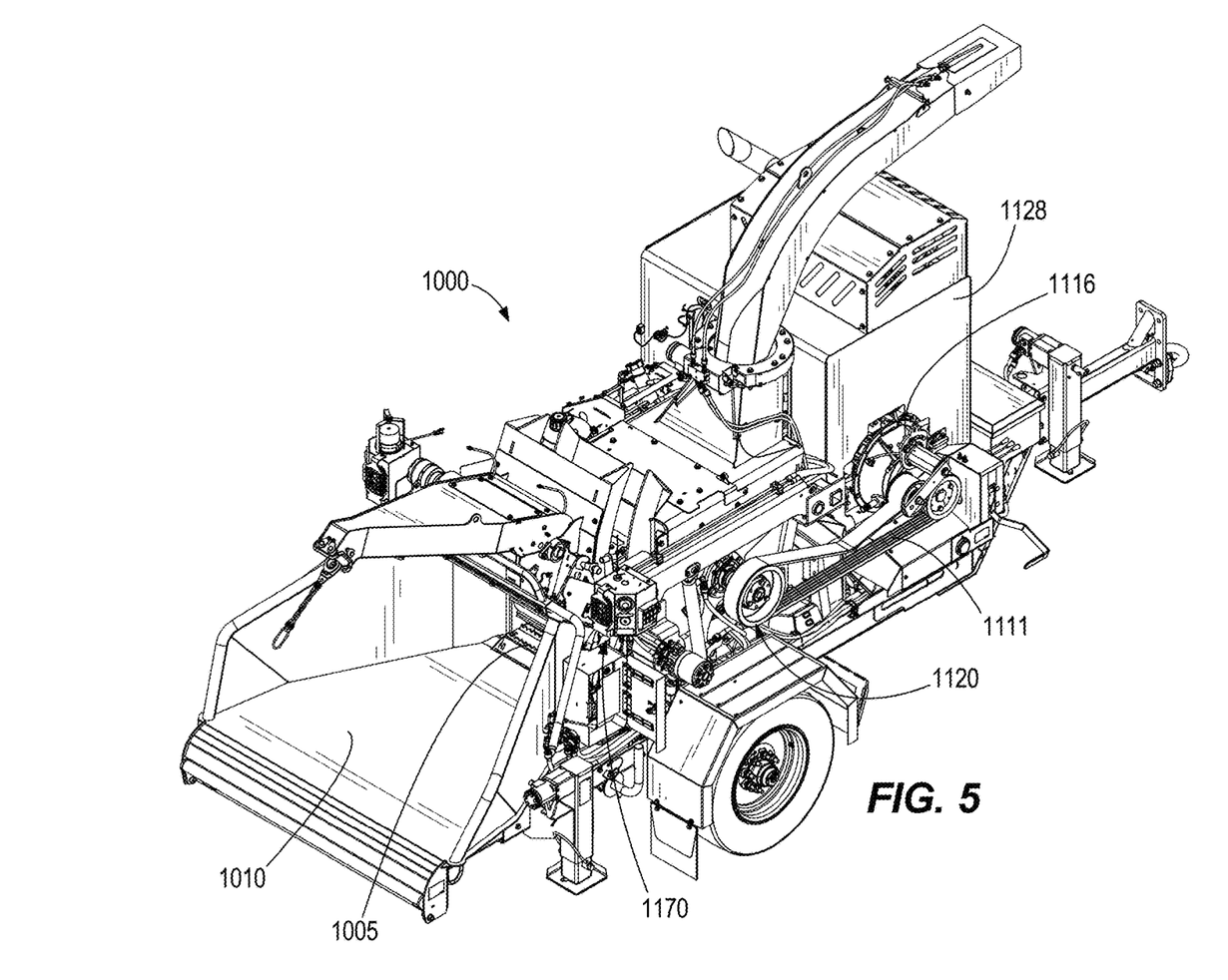
FIG. 5 is a perspective view of a brush chipper according to one embodiment of the present disclosure.
Figure 6:
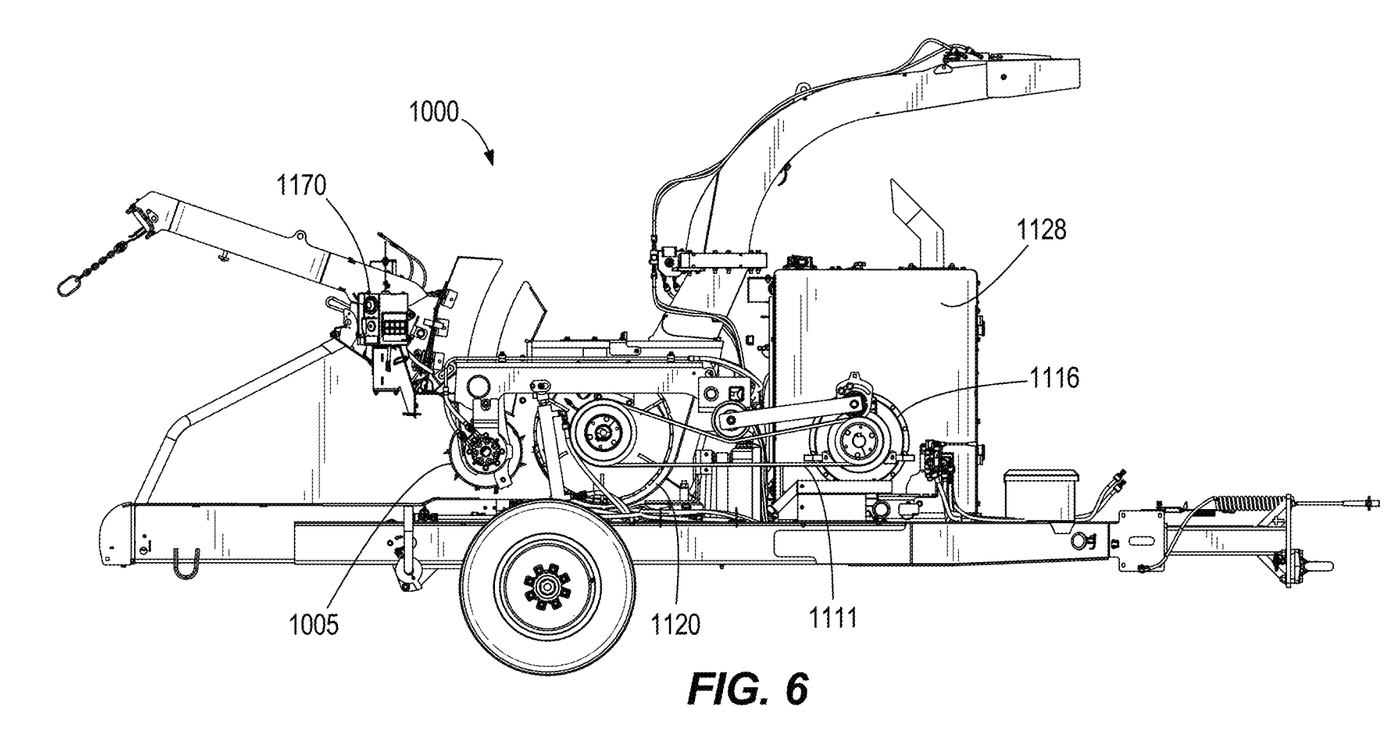
FIG. 6 is a side elevation view of the brush chipper of FIG. 5, with components hidden for illustration.

FIGS. 5 and 6 illustrate another material reduction machine, in particular a brush chipper 1000, to which aspects of the present disclosure may be applied. Despite the physical differences between stump cutter 100 and brush chipper 1000, some of which are detailed below, the brush chipper 1000 may provide dynamic start-up control that follows the preceding description. Thus, the description of the brush cutter 1000 is kept to minimum so as to avoid unnecessary repetition. The brush chipper 1000 primarily differs from stump cutter 100 it that the brush chipper 1000 has a material infeed chute 1010 and material infeed system 1005. The material infeed system 1005 moves material to the material reduction portion of the brush chipper 1000. The material reduction portion of the brush chipper 1000 includes a chipping drum 1120, which may have a plurality of cutters or knives. Similar to the cutter wheel 120 of stump cutter 100, the chipping drum 1120 rotates at a high-speed during operation. The chipping drum 1120, and other components of the brush chipper 1000, are powered by the prime mover 1128. The input portion of a clutch 1116 is attached to an output shaft from the prime mover 1128. The clutch 1116 can be optionally engaged and disengaged similar to the clutch 116 of the stump cutter 100 to transfer power. The output portion of the clutch 1116 is connected to the chipping drum 1120 by a drive system, such as belt 1111. Despite some fundamental constructional differences between the brush chipper 1000 and the stump cutter 100, the brush chipper 1000 can also be provided with sensors and a controller 1170 according to the description of the stump cutter 100 so that the brush chipper 1000 is configured to provide dynamic start-up control that changes the disengagement points for stopping sequential engagement cycles of the cutting mechanism (e.g., the chipping drum 1120) according to maximum load data on a cycle-by-cycle basis.

Figure 7:
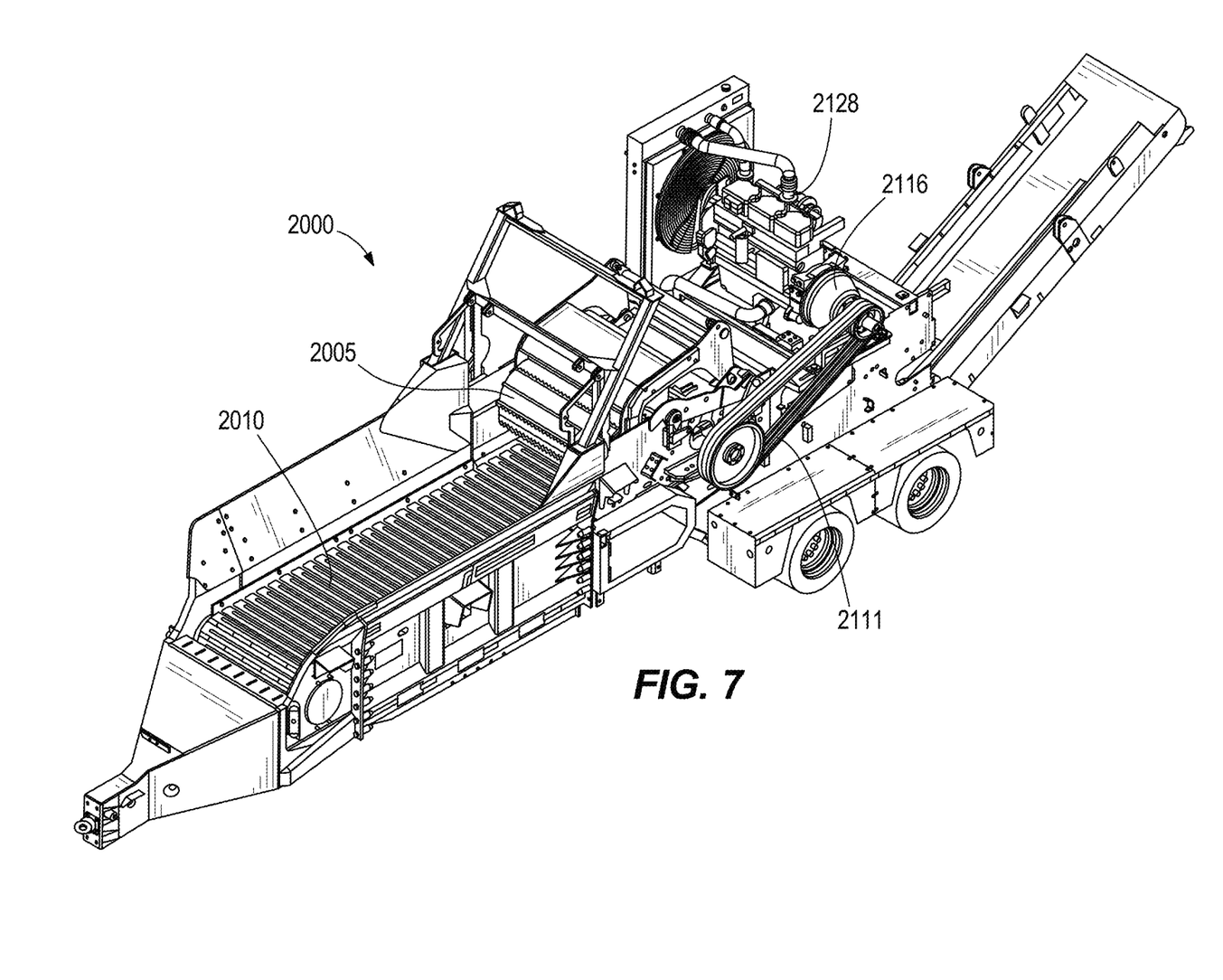
FIG. 7 is a perspective view of a grinder according to one embodiment of the present disclosure.
Figure 8:
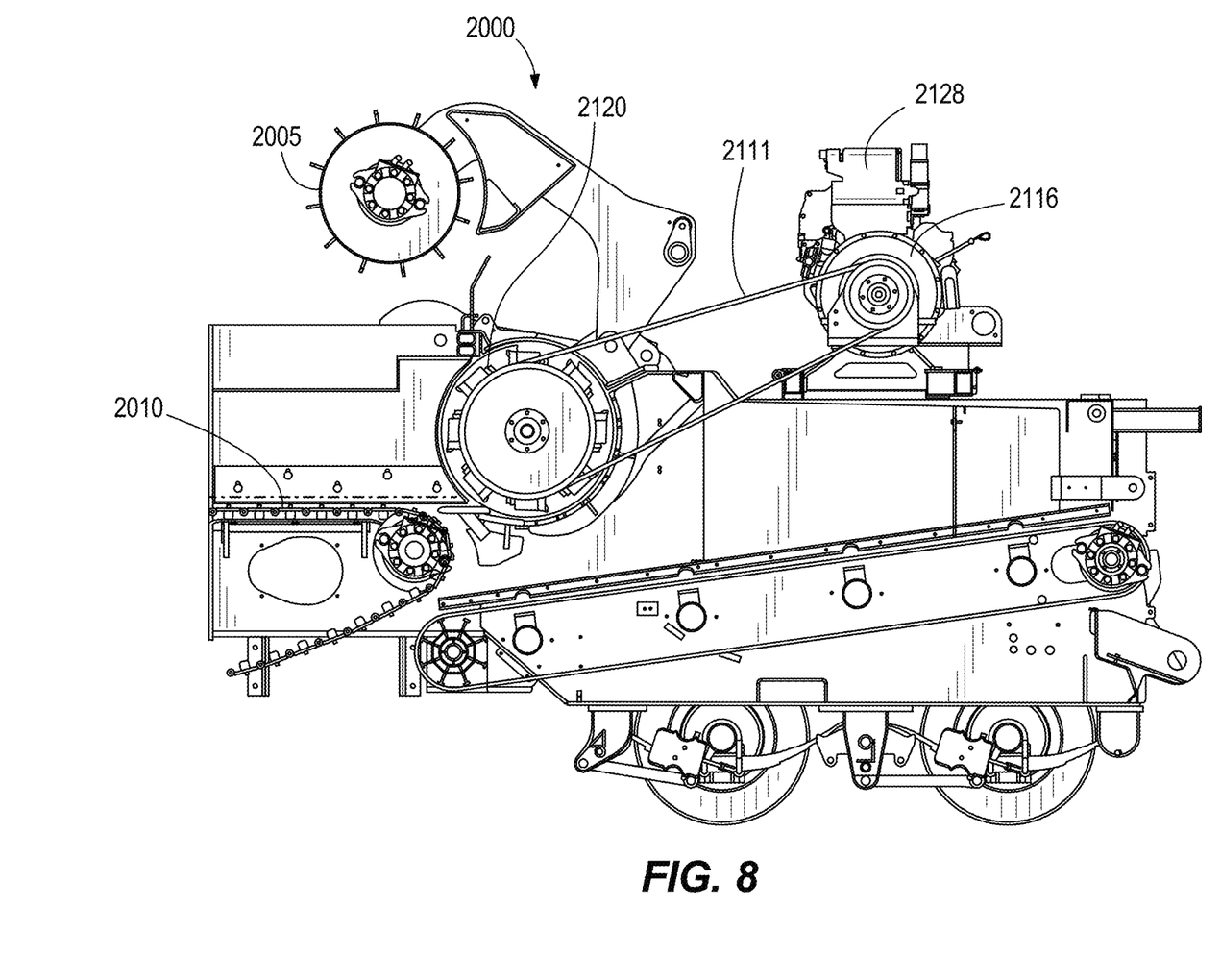
FIG. 8 is a side elevation view of the grinder of FIG. 7, with components hidden for illustration.

FIGS. 7 and 8 illustrates yet another material reduction machine, in particular a grinder 2000, to which aspects of the present disclosure may also be applied. Despite the physical differences between the stump cutter 100 and the grinder 2000, some of which are detailed below, the grinder 2000 may provide dynamic start-up control that follows the preceding description. Thus, the description of the grinder 2000 is kept to a minimum so as to avoid unnecessary repetition. The grinder 2000 primarily differs from the stump cutter 100 it that the grinder 2000 has a material infeed conveyor 2010 and a material infeed system 2005. The material infeed system 2005 moves material to the material reduction portion of the grinder 2000. The material reduction portion of the grinder 2000 includes a grinding drum 2120, which may have a plurality of cutters or hammers. Similar to the cutter wheel 120 of the stump cutter 100, the grinding drum 2120 rotates at a high-speed during operation. The grinding drum 2120, and other components of the grinder 2000, are powered by the prime mover 2128. The input portion of a clutch 2116 is attached to an output shaft from the prime mover 2128. The clutch 2116 can be optionally engaged and disengaged similar to the clutch 116 of the stump cutter 100 to transfer power. The output portion of the clutch 2116 is connected to the grinding drum by a drive system, such as a belt 2111. Despite some fundamental constructional differences between the grinder 2000 and the stump cutter 100, the grinder 2000 can also be provided with sensors and a controller according to the description of the stump cutter 100 so that the grinder 2000 is configured to provide dynamic start-up control that changes the disengagement points for stopping sequential engagement cycles of the cutting mechanism (e.g., the grinding drum 2120) according to maximum load data on a cycle-by-cycle basis.

Although the invention has been described in detail with reference to certain preferred embodiments, variations and modifications exist within the scope and spirit of one or more independent aspects of the invention as described.

What is claimed is:

1. A material reduction machine comprising:
a cutting mechanism;
a prime mover;
a drive system coupled with the cutting mechanism and prime mover configured to drive the cutting mechanism, the drive system having a clutch;
the clutch having an engaged state wherein the clutch transfers power from the prime mover to the cutting mechanism, and a disengaged state wherein power is not transferred from the prime mover to the cutting mechanism;
a sensor operable to sense a machine load parameter; and a controller coupled to the sensor and programmed to receive a signal representing the sensed machine load parameter, the controller being operatively coupled to the clutch to control engagement and disengagement of each of a plurality of sequential engagement cycles of the clutch, wherein the controller is further programmed to:

utilize a stored first disengagement threshold value of the machine load parameter for disengaging the clutch of a first engagement cycle of the plurality of sequential engagement cycles when the sensor signals to the controller that the first disengagement threshold value is realized, continue monitoring the sensor signal of the machine load parameter momentarily after reaching the first disengagement threshold, determine and adopt a second disengagement threshold value, the second disengagement threshold value being based on an observation of the sensed machine load parameter indicative of maximum load during the continued monitoring after the first disengagement threshold is realized, and further being based on a stored correction factor, and utilize the second disengagement threshold value for disengaging the clutch of a second engagement cycle of the plurality of sequential engagement cycles following the first engagement cycle when the sensor signals to the control that the second disengagement threshold value is realized.

2. The material reduction machine of claim 1, wherein the controller is further programmed to adopt a third disengagement threshold value, the third disengagement threshold value being based on an observation of the machine load parameter indicative of maximum load during continued monitoring of the sensor signal after the second disengagement threshold is realized, and further being based on the correction factor.

3. The material reduction machine of claim 1, wherein the controller is further programmed to calculate a difference between a target value of the machine load parameter corresponding to a maximum allowable machine load and the value of the machine load parameter indicative of the maximum load after the first disengagement threshold is realized, and calculate the second disengagement threshold value by applying the correction factor to the calculated difference so that the actual maximum machine load after the second disengagement threshold is realized is brought closer to the maximum allowable machine load than the actual maximum machine load after the first disengagement threshold is realized.

4. The material reduction machine of claim 1, wherein the prime mover is an internal combustion engine, and the machine load parameter is operation speed of the internal combustion engine.

5. The material reduction machine of claim 1, wherein the clutch is an electromagnetic clutch, and an equal amount of voltage is applied to the clutch during every clutch engagement of the plurality of sequential engagement cycles.

6. The material reduction machine of claim 1, wherein the prime mover is an electric motor and the machine load parameter is torque output from the electric motor or electrical current draw by the electric motor.

7. The material reduction machine of claim 1, wherein the controller is further programmed to identify completion of a cutting mechanism start-up process including the plurality of sequential clutch engagement cycles, and in response to identifying the completion of the cutting mechanism start-up process, re-adopt the stored first disengagement threshold value for a first engagement cycle of a subsequent cutting mechanism start-up process.

8. The material reduction machine of claim 7, wherein the controller is further programmed to identify completion of a cutting mechanism start-up process including the plurality of sequential clutch engagement cycles in response to the clutch being engaged for a predetermined amount of elapsed time without disengagement.

9. The material reduction machine of claim 7, wherein the controller is further programmed to identify completion of a cutting mechanism start-up process including the plurality of sequential clutch engagement cycles in response to not reaching the disengagement threshold value within a predetermined amount of time during the corresponding engagement cycle, which is the first engagement cycle, the second engagement cycle, or a subsequent engagement cycle.

10. The material reduction machine of claim 1, wherein the controller is programmed to begin the plurality of sequential engagement cycles when the sensor signals the prime mover is rotating at a predefined idle speed.

11. The material reduction machine of claim 1, wherein the material reduction machine is a stump cutter, and the cutting mechanism is a cutter wheel having a plurality of comminution cutters.

12. The material reduction machine of claim 1, wherein the cutting mechanism of the material reduction machine is a drum having a plurality of comminution cutters.

13. The material reduction machine of claim 1, wherein the controller is further programmed to abort the plurality of sequential engagement cycles and/or prevent a subsequent plurality of sequential engagement cycles upon determination that the plurality of sequential engagement cycles constitute an unsuccessful cutting mechanism start-up process in which the cutting mechanism fails to reach a predefined running state for material reduction.

14. The material reduction machine of claim 13, wherein the controller is programmed to determine the unsuccessful cutting mechanism start-up process on the basis of a stored maximum limit value for number of clutch engagement cycles.

15. The material reduction machine of claim 13, wherein the controller is programmed to determine the unsuccessful cutting mechanism start-up process on the basis of a cutting mechanism speed or a drive system speed.

16. A material reduction machine comprising:
a cutting mechanism;
an internal combustion engine;
a drive system configured coupled to the internal combustion engine and the cutting mechanism configured to selectively transfer power from the internal combustion engine to the cutting mechanism;
the drive system having a clutch;
the clutch having a power transfer state wherein the clutch transfers power from the prime mover to the cutting mechanism, and a disengaged state wherein power is not transferred from the prime mover to the cutting mechanism;
a sensor operable to sense a load on the material reduction machine via detection of droop in the operation speed of the internal combustion engine; and
a controller coupled to the sensor and programmed to receive a signal indicative of the sensed droop in the operation speed, the controller being operatively coupled to the clutch to control power transfer of each of a plurality of sequential power transfer cycles, wherein the controller is programmed to:

utilize a stored first operation speed trip point for disengaging a first power transfer cycle of the plurality of sequential power transfer cycles when the sensor signals to the controller that the first operation speed trip point is realized, and to continue monitoring further droop in the operation speed via the sensor signal after reaching the first operation speed trip point, determine and adopt a second operation speed trip point, the second operation speed trip point being based on an observation of a minimum operation speed during the continued monitoring after the first operation speed trip point is realized, and further being based on a stored correction factor, and utilize the second operation speed trip point for disengaging a second power transfer cycle of the plurality of sequential power transfer cycles following the first power transfer cycle when the sensor signals to the controller that the second operation speed trip point is realized.

17. The material reduction machine of claim 16, wherein the controller is further programmed to adopt a third operation speed trip point based on an observation of a minimum operation speed during continued monitoring of the sensor signal after the second operation speed trip point is realized, and further based on the correction factor.

18. The material reduction machine of claim 16, wherein the controller is further programmed to calculate a difference between the minimum operation speed during the continued monitoring after the first operation speed trip point is realized and a stored target operation speed corresponding to a minimum allowable operation speed, and wherein the controller is further programmed to calculate the second operation speed trip point value by applying the correction factor to the calculated difference so that the minimum operation speed after the second operation speed trip point is brought closer to the target operation speed than the minimum operation speed after the first operation speed trip point is realized.

19. The material reduction machine of claim 18, wherein the controller is further programmed to calculate, for every new power transfer cycle of the plurality of sequential power transfer cycles beyond the first power transfer cycle, a new operation speed trip point based on the difference between the target operation speed and the minimum operation speed observed at the end of the power transfer cycle immediately prior to the new power transfer cycle.

20. The material reduction machine of claim 16, wherein the controller is further programmed to identify completion of the plurality of sequential power transfer cycles, and in response, to revert to the stored first operation speed trip point.

21. The material reduction machine of claim 20, wherein the controller is further programmed to identify completion of a cutting mechanism start-up process including the plurality of sequential power transfer cycles in response to the clutch being engaged for a predetermined amount of elapsed time without disengagement.

22. The material reduction machine of claim 20, wherein the controller is further programmed to identify completion of a cutting mechanism start-up process including the plurality of sequential power transfer cycles in response to the operation speed of the internal combustion engine remaining at a no load state for a predetermined amount of time.

23. The material reduction machine of claim 16, wherein the controller is further programmed to begin the plurality of sequential engagement cycles when the sensor signals the engine is rotating at a predetermined idle speed.

24. The material reduction machine of claim 16, wherein the material reduction machine is a stump cutter, and the cutting mechanism is a cutter wheel having a plurality of comminution cutters.

25. The material reduction machine of claim 16, wherein the cutting mechanism of the material reduction machine is a drum having a plurality of comminution cutters.

26. A method of controlling a material reduction machine including a cutting mechanism and a prime mover coupled with the cutting mechanism to drive the cutting mechanism, the method comprising:

operating the prime mover at a no load operation speed;

engaging a clutch to transfer power from the prime mover to the cutting mechanism to start a first engagement cycle;

sensing a machine load parameter with a sensor that reports signals to a controller in control of engaging and disengaging the clutch to control starting and stopping of each of a plurality of sequential engagement cycles;

triggering, via the controller, disengagement of a first engagement cycle of the plurality of sequential engagement cycles in response to the sensor signaling to the controller that a stored first disengagement threshold value is realized;

continuing monitoring, with the controller, the machine load parameter sensor signal to a maximum load momentarily after reaching the first disengagement threshold, the controller determining and adopting a second disengagement threshold value based on the value of the machine load parameter at the time of maximum load after the first disengagement threshold is realized, and further based on a stored correction factor; and triggering, via the controller, disengagement of a second engagement cycle of the plurality of sequential engagement cycles following the first engagement cycle in response to the sensor signaling to the controller that the second disengagement threshold value is realized.

* * * * *